J. H. FLATLEY.
HOG TRAP.
APPLICATION FILED JULY 16, 1914.
1,135,004.
Patented Apr. 13, 1915.
2 SHEETS—SHEET 1.
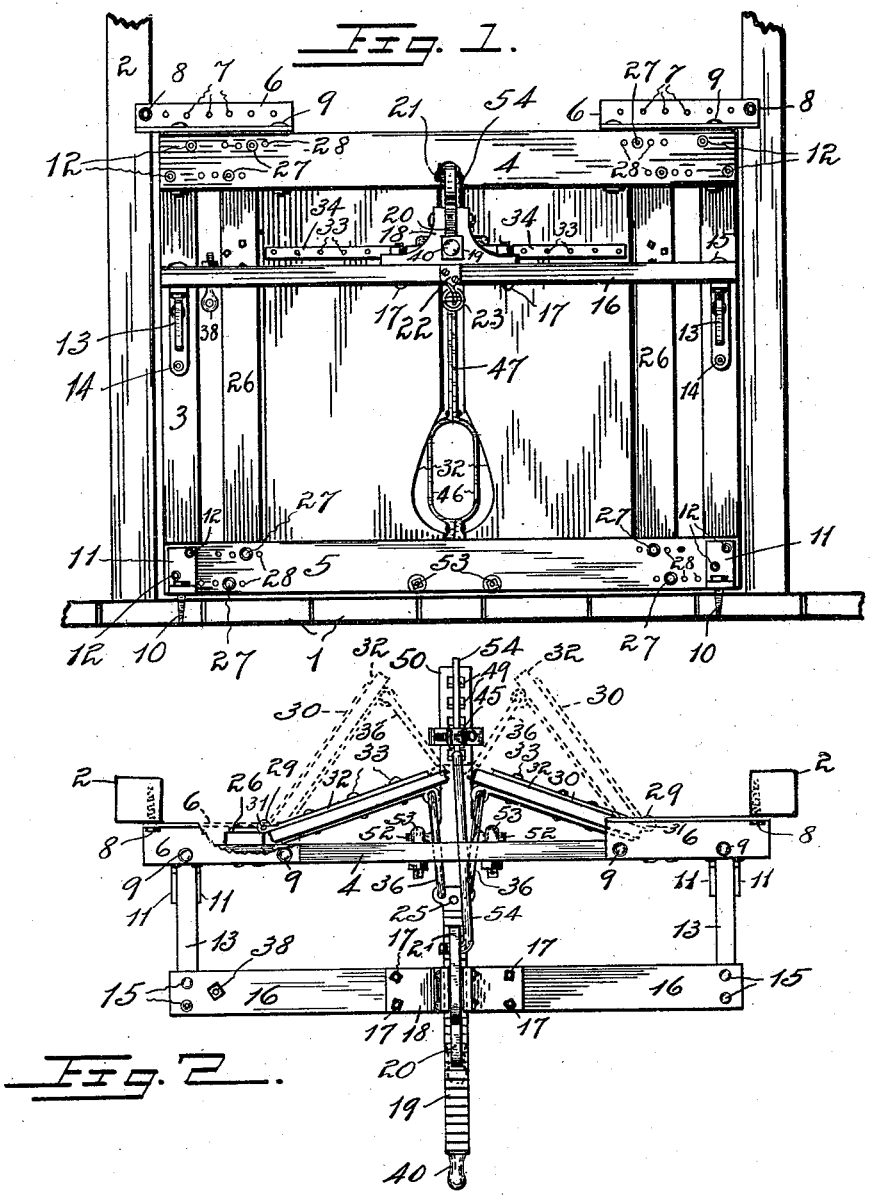
WITNESSES:
C. I. Richards.
E. T. Martin.
INVENTOR:
John H. Flatley,
BY H. W. Richards,
ATTORNEY J. H. FLATLEY.
HOG TRAP.
APPLICATION FILED JULY 16, 1914.
1,135,004.
Patented Apr. 13, 1915
2 SHEETS—SHEET 2.
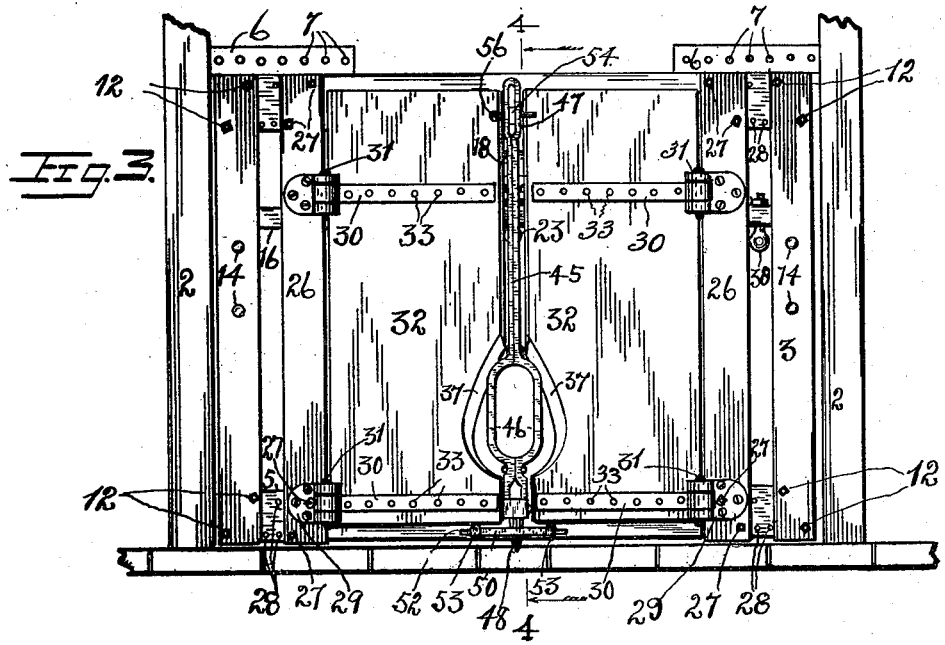
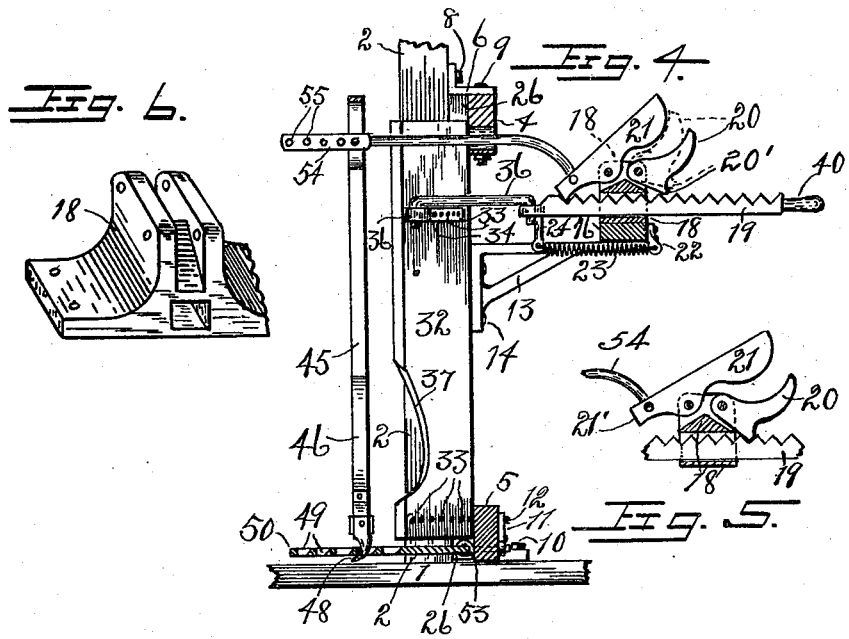
WITNESSES:
INVENTOR:
BY
ATTORNEY.

UNITED STATES PATENT OFFICE.

JOHN H. FLATLEY, OF HENDERSON COUNTY, NEAR LITTLE YORK, ILLINOIS.

HOG-TRAP.

1,135,004.  Specification of Letters Patent.  Patented Apr. 13, 1915.

Application filed July 16, 1914. Serial No. 851,313.

*To all whom it may concern:*

Be it known that I, JOHN H. FLATLEY, a citizen of the United States, and a resident of Henderson county, near Little York, Warren county, Illinois, have invented a new and useful Hog-Trap, of which the following is a specification.

My invention relates to devices for automatically catching and holding hogs.

One of the objects of the invention is to provide a device which, when a hog attempts to pass through it, will by him be tripped to grasp him about the neck and hold him from movement either forward or back.

Another object is to provide means for setting the trap for hogs of different sizes.

Another object is to provide a portable trap adapted for placement in barn or stable doorways differing in their widths and means for securing it therein.

It is an object to provide means whereby the trap doors may be set at suitable and predetermined distances apart.

It is an object to provide an animal-actuated trip-releasing mechanism, whereby the animal will in some events spring the trap earlier than at other times.

Other objects consist in providing novel structural peculiarities and novel combinations of parts.

Minor objects will be in part obvious and in part pointed out.

In the accompanying drawings, which illustrate a preferred embodiment of my invention, Figure 1 is a front elevation; Fig. 2, a top plan; Fig. 3, a rear elevation; Fig. 4, a transverse section, taken in the line 4—4 in Fig. 3; Fig. 5, a detail of the locking dogs; and Fig. 6, a detail of the main casting, partly broken away.

Coming now to a detailed description of the drawings and referring to each element thereof by a distinguishing reference numeral, uniformly employed, 1 designates a floor, and 2, 2, a pair of door jambs thereon.

3, 3 indicate a pair of side frame bars united by an upper cross-plate, 4, and a lower cross-plate 5.

6, 6, are angle iron plates each of which is provided with a series of apertures 7, either of which is adapted for the reception of a lag screw 8 whereby it may be secured to the adjacent jamb 2.

9, 9 designate bolts by which said brackets are secured to the opposite ends of the plate 4. By placing the screws 8 in proper ones of the openings 7 the frame 4—5 and thereby the trap may be secured in doorways differing in widths. After being so placed, lag screws 10 are passed through apertures in the horizontal arms of brackets 11 and threaded into the floor 1, the vertical arms of said brackets being secured by bolts 12 to the plate 5.

13, 13 designate a pair of brackets secured one to each frame-bar 3, by bolts 14. Secured by bolts 15 on the rear ends of these brackets is a supporting bar 16. Fixed by bolts 17 on and at the midlength of said bar 16 is a casting 18 provided with a longitudinally arranged way in which is slidably seated a rack 19 preferably having two-faced teeth. Pivoted between the spaced upper leaves of the casting 18, and at its rear edge, is a manually operable locking dog 20, the locking point of which (see Fig. 4) is designated by 20' and which is directed rearwardly. Pivoted between the same leaves but forwardly of the dog 20 is a counterweighted setting dog 21, the locking point 21' of which (Fig. 5) is directed forwardly. Suitably secured on the rear edge of the bar 16 is an eye 22 which is engaged by one end of a contractile spring 23 the other end of which engages a pin 24 (Fig. 4) which is secured in an eye 25 (Fig. 2) in the head of the rack 19. The spring thus tends to draw the rack constantly rearward.

26, 26 designate a pair of movable frame bars each adapted for selective placements with relation to the plates 4 and 5 by means of bolts 27 which may be passed through optional corresponding pairs of apertures 28 in said plates, whereby to move the trap doors (presently described) toward or from each other.

29, 29 designate hinge butts secured in pairs on each bar 26.

30, 30 indicate hinge leaves engaged by pintles 31 with said butts.

32, 32 indicate trap doors secured each to a corresponding pair of said leaves by rivets 33. Secured on the opposite side of each door, and by said rivets, is a reinforce plate 34, one end of which is bent to form an eye 35. Each of these eyes receives one bent end of a link 36, the other bent end of which engages an eye in the forward end or head of the rack 19.

The adjacent edges of the doors are cut away near their lower portions to provide an opening of suitable size and shape to catch and hold the hog, and in order that he may be the more securely held, I have beveled off the anterior edges of the cut away portions, as shown at 37 in Figs. 3 and 4.

For convenience in securing a hind leg of the hog, (for purposes well known to stock raisers,) I have provided an eye 38 which is shown as secured to the bar 16 and to which may be secured any suitable means for effecting the purpose named.

45 designates a dog-releasing bar formed preferably of a pair of strips of metal bent to form loops 46 and 47, and secured together in any desired manner.

48 indicates a hook at its lower end, adapted to engage a selective one of a series of apertures 49 in a plate 50, the butt of which is formed at a right angle thereto and extended to form a pair of oppositely directed trunnions 52 which are seated loosely each in the eye of a bolt 53 passed through the frame bar 5.

54 indicates a link the bent rear end of which engages an eye in the fore end of the dog 21 and the forward end of which is provided with a series of apertures 55 either one of which is adapted to receive a pin 56 whereby the bar 45 may be selectively engaged with said link 54.

The operation: Assume the parts to be in the relative positions shown in Figs. 2 and 4, and a hog to be advancing toward the trap, from its rear side. Seeing the opening between the doors and fearing no danger he will attempt to pass therethrough. The trap having been set so that this opening is of a size which will permit his head and neck to pass without injury, his broader shoulders will strike and carry the doors forwardly, and these drawing on the rack 19 (through the medium of the eyes 35 and links 36) will cause the dog point 21'—which has been held by frictional contact only against a rack tooth—to release, whereupon the dog *per se* (being a counterweight) will assume the position shown in Fig. 5. The spring 23 will instantly act to draw the pin 24 and through it the rack 19, links 36, eyes 34 and doors 32 backward, to automatically close the doors on the sides of the animal's neck. The lever 20 will meanwhile have fallen into the position shown in Fig. 5. Should the hog attempt to move forwardly he cannot escape, for the point 20' is locked against a rack tooth and is restraining the rack and doors from forward movement. Should he attempt to move backward the door-edges will bind the tighter about his neck, for the dog point 20' will be ratcheted over by one or more teeth to permit the rack and thus the doors to move backward.

It sometimes occurs that a thin hog will enter the trap when it is set for larger ones. To prevent his head and shoulders passing through the doors, which might grasp him at or near his flanks, I have provided the dog-releasing bar 46 and the parts adapted for coöperation therewith, the operation of which is as follows: Should the animal's head not strike the doors in a manner to release the dog 20 it will strike the loop 46 placed immediately in front of the opening between said doors. This will throw the bar 45 slightly forward and its upper end, through the medium of the pin 56, will pull on the link 54 to free the tip 21' of the dog 21 from engagement with the rack-bar tooth, whereupon the spring 23 will act as above described to draw the doors back and grasp the hog by the neck. It will be manifest that the hook may engage either aperture 49 and that the upper end of the bar may be adjusted to coöperate with either hole 55 in the link, whereby either or both ends of the bar may be adjusted relatively to the doors. Also it will be clear that the bar or the bar and link may be removed almost instantly, or may be dispensed with, and that being pivotally mounted the plate 50 will flex or yield to a shock when the bar 45 is forcibly struck, and that it is practically impossible to get it out of order.

To release the animal it is necessary only to raise the heel of the dog 20, free the point 20', and by means of the handle 40 slide the rack 19 forward to spread the doors.

The distance of divergence of the doors, in setting the trap to catch larger or smaller hogs, is governed by the dog 21, and as this is its function I shall hereinafter term it a "setting" dog. And inasmuch as the dog 20 is intended in its principal function to lock the doors from movement, I shall hereinafter designate it a "locking" dog.

It has been thought neither necessary or best to encumber this specification and the accompanying drawings with descriptions and illustrations of modifications which are neither essential to nor form any part of the invention. In fact, it is apparent without such that numerous changes may be made in the details of construction and by modifications involving merely mechanical skill, without departing from the spirit and scope of the invention, viewed in its broadest aspect. All this will be pointed out in the claims hereof, wherein the omission of an element or the non-inclusion of reference to the detail features of the elements recited is intended to be a formal declaration of the fact that the omitted elements are not essential to the invention covered by that claim.

Therefore, without limiting myself to particularities, I claim as new and desire to secure by Letters Patent the following, to-wit:

1. In a hog-trap, the combination with a pair of doors adapted for alinement and for divergence, of a longitudinally movable rack connected to both doors and arranged at a right angle thereto when they are in alinement, and means for releasably holding said rack and thereby said doors in selective divergent positions.

2. In a hog trap, the combination with a pair of doors adapted for alinement and for divergence, of a rack connected with both of said doors, a spring adapted to draw rearwardly on said rack to bring the doors into alinement, and means whereby the spring is held tensioned and the doors held divergent.

3. In a hog trap, the combination with a pair of doors adapted for alinement and for divergence, of a rack connected with both of said doors, a dog and a spring whereby said rack and doors may be held in set position, and a dog for holding said rack and doors from forward movement.

4. In a hog trap, the combination with a pair of doors adapted for alinement and for divergence, of a rack connected with both of said doors, means coöperating with said rack for holding said doors in set position and means for holding the rack in frictional contact with the last recited element.

5. In a hog trap, the combination with a pair of doors adapted for alinement and for divergence, of a rack connected with both of said doors, a setting dog adapted for selective engagement with the teeth of said rack, and a locking dog adapted to both ratchet over and lock against a tooth thereof.

6. In a hog trap, a pair of doors adapted for alinement and for divergence, means for controlling their divergence, and means for securing them at different distances apart when in alinement.

7. In combination, a pair of horizontally swinging trap doors, their free edges normally adjacent, a rack connected with both of said doors, a setting-dog adapted for engagement with the teeth of said rack, means adapted to be struck by an animal attempting to pass between said doors, whereby said dog is released from engagement with said rack, and a spring for drawing the doors toward or into alinement.

8. In combination, a pair of trap doors adapted for alinement and for divergence, a rack connected with both of said doors, a setting-dog adapted for engagement with selective teeth of said rack, a movable member adapted to be tripped by an animal to release said dog from said rack, and a spring for drawing said doors toward or into alinement.

9. The combination with a pair of swinging trap doors and with a rack engaged therewith, of an element arranged vertically in front of the opening between said doors, means for adjusting its lower end toward or from said doors, a dog adapted for engagement with said rack, a link connecting the upper end of said vertically arranged element with said dog, and a spring for drawing the doors toward or into alinement.

10. In an animal-trap, co-acting trapping doors, a rack connected to both thereof, door-setting means coacting with said rack and adapted to be released by an animal as he comes in contact with said doors, and a spring for drawing said doors into animal-grasping position.

11. In an animal-trap, coacting trapping-doors adapted to diverge, a rack connected to both thereof, setting means adapted to coact with said rack and to be released by an animal as he comes in contact with said doors, and means for drawing said doors into grasping contact with an animal upon the release of said setting means.

12. In an animal-trap, coacting trapping doors, a rack connected to both thereof, and spring controlled release-means coöperating with said rack whereby the contact of an animal against adjacent edges of said doors releases them to grasp the animal between said edges.

13. In an animal-trap, coacting trapping doors, a rack connected to both thereof, and a dog, as 20 adapted to be ratcheted over by one or more teeth of said rack, due to the backward movement of an animal caught between adjacent edges of said doors, said ratcheting tending to draw the edges of the doors into tighter engagement with the animal.

In witness whereof I hereunto set my hand this 6th day of July, 1914.

JOHN H. FLATLEY.

Witnesses:
S. L. THOMSON,
R. L. BROWNLEE.

Copies of this patent may be obtained for five cents each, by addressing the "Commissioner of Patents, Washington, D. C."